United States Patent [19]

Bradley

[11] 4,327,285
[45] Apr. 27, 1982

[54] ELECTRON-OPTICAL IMAGE TUBES AND STREAK CAMERAS

[76] Inventor: Daniel J. Bradley, 51 Wellington Rd., Dublin 4, Ireland

[21] Appl. No.: 23,312

[22] Filed: Mar. 23, 1979

[30] Foreign Application Priority Data

Mar. 23, 1978 [GB] United Kingdom ............... 11546/78

[51] Int. Cl.³ .......................... H01J 31/50; G01J 1/00
[52] U.S. Cl. .............................. 250/213 VT; 356/213
[58] Field of Search ................. 250/213 VT; 356/226, 356/213

[56] References Cited

U.S. PATENT DOCUMENTS 3,761,614 9/1973 Bradley .............................. 356/226
3,973,117 8/1976 Bradley .............................. 356/213

Primary Examiner—John K. Corbin
Assistant Examiner—Rodney B. Bovernick
Attorney, Agent, or Firm—Young & Thompson

[57] ABSTRACT

A record is obtained of repetitive optical phenomena having durations in the picosecond or subpicosecond range by synchronizing the deflection of the electron image in an electron-optical streaking image tube with the repetition rate of a pulse train from a continuous wave mode-locked laser which supplies such pulses to the tube. Synchronization may be effected by supplying a reference frequency signal both to the laser and to the deflection electrodes in the image tube. The signal applied to the deflection electrodes may comprise a synchronized sinusoidal voltage signal and a slowly varying bias voltage signal. An optical multi-channel analyser may be used at the output of the image tube, linked to an oscilloscope or pen recorder.

22 Claims, 10 Drawing Figures

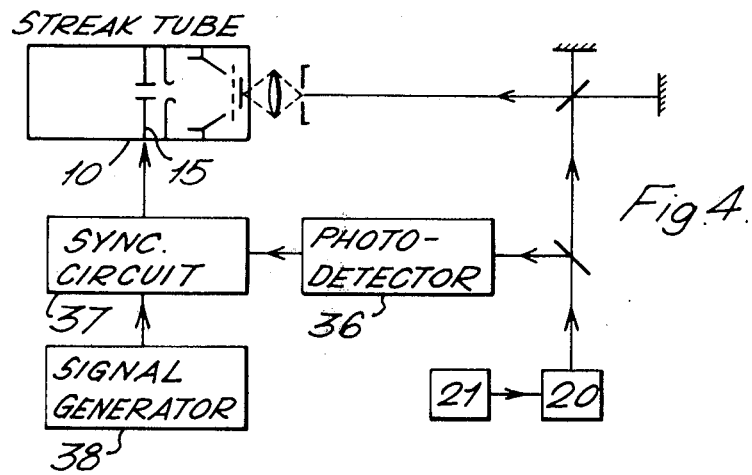
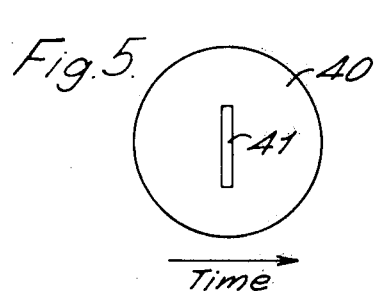
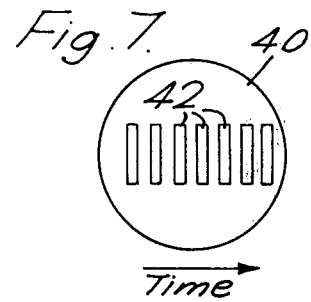
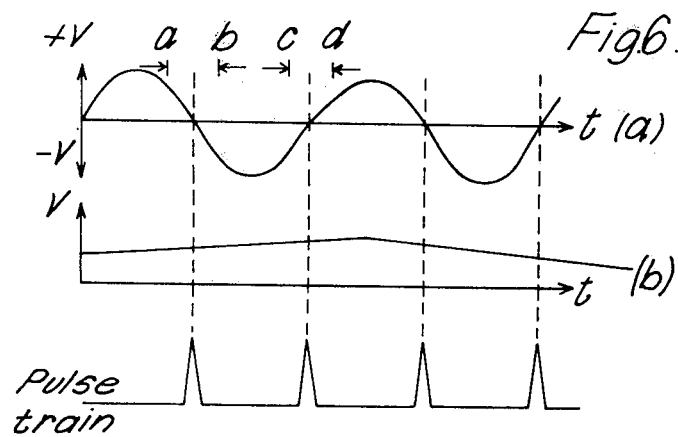

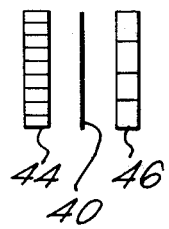
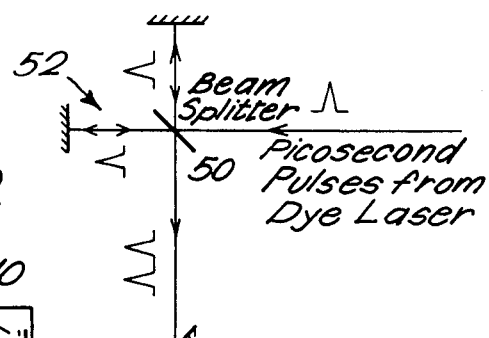
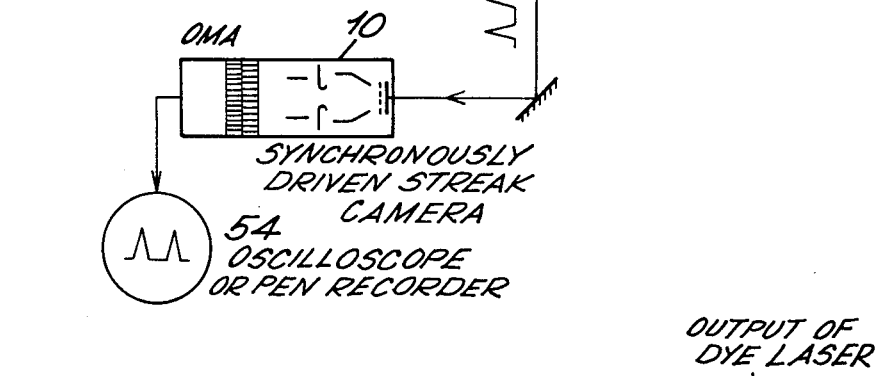

ELECTRON-OPTICAL IMAGE TUBES AND STREAK CAMERAS

BACKGROUND TO THE INVENTION

This invention relates generally to the measurement and study of optical phenomena which occur at very high repetition rates and which have a time duration in the picosecond or sub-picosecond range. The invention is particularly concerned with electron-optical image tube systems for use in obtaining a record of pulses generated from a laser, and also with streak cameras operating with a time resolution of the picosecond or sub-picosecond range and capable of providing direct linear measurement of such ultra-short pulses.

My U.S. Pat. No. 3,973,117 describes an electron-optical image tube system which is particularly suited for use with a continuous wave mode-locked laser and which enables a direct linear intensity profile of the average pulse of a pulse train to be obtained.

The image tube system described in the aforesaid patent specification comprises a photocathode for receiving repetitive pulse-form light images and converting them to pulses of photoelectrons, an extraction electrode immediately adjacent to the emission side of the photocathode to accelerate the photoelectrons away from the photocathode and project them into a path on the output side of the extraction electrode at increased velocity, deflection electrodes on the path of the photoelectrons beyond the extraction electrode, means defining an aperture beyond said deflection electrodes on which the photoelectrons are arranged to impinge, the deflection electrodes being arranged to cause the electrons to follow a path at the aperture-defining means having a rotational component of motion about the longitudinal axis of the tube, control means adjustable so that the photoelectron pulses may be caused to coincide with the aperture, and detector means on the side of the aperture remote from the electrodes to receive photoelectrons passing through the aperture.

The means defining the aperture may be a plate positioned on the axis of the tube and perpendicular to the axis, with one or more slits therethrough disposed along radii of the tube.

When used with a source of ultra-short light pulses the known system may include phase control means to control the phase of the voltage applied to the deflection electrodes to produce a circular or spiral deflection path on the means defining the aperture.

SUMMARY OF THE INVENTION

It is an object of the present invention to provide an improved method and apparatus for the study of optical phenomena generated by picosecond and sub-picosecond pulses and for the study of the pulses themselves. Frequency-tunable mode-locked dye lasers are routinely used in conjunction with picosecond streak cameras for selective excitation and direct measurement of the resulting phenomena, luminous or absorptive, occurring in materials of biological, chemical and condensed matter physics interest. As well as enabling basic scientific measurements to be carried out in the fields of physics, chemistry and biology, the method and apparatus of the present invention have applications also to optical communications, data processing, telecommunications, etc. In all these areas one can have phenomena occurring at very high repetition rates, for example up to gigabits.

It is another object of the invention to achieve accumulation of data at the output end of the image tube to enable a steady streak image to be built up.

It is a further object of the present invention to provide an arrangement whereby the streak camera can be used to measure dye fluorescence lifetimes and other emissions from dyes and like materials.

In accordance with the present invention there is provided apparatus for obtaining a record of repetitive optical phenomena having durations in the picosecond or sub-picosecond range, comprising a streak image tube arranged to receive repetitive pulse-form images and convert them to electron images, a continuous wave mode-locked laser arranged to generate a repetitive series of pulses, and synchronising means arranged to synchronise the deflection of the electron image in the tube with the repetition rate of the pulse train from the continuous wave mode-locked laser.

Also in accordance with the present invention there is provided a method of obtaining a record of repetitive optical phenomena having durations in the picosecond or sub-picosecond range in which a continuous wave mode-locked laser generates a repetitive series of pulses which are fed to a streaking image tube, and the streaking image tube is operated in a continuous scanning mode with the streak deflecting voltage driven synchronously at the repetition frequency of the pulse train from the laser.

The synchronisation of the image tube streak deflecting voltage with the repetition frequency of the laser pulse train means that instead of the streaks being recorded as transients, successive streaks are superimposed precisely on one another. This accumulation of time-resolved data means that one can obtain a steady streak image on the streak tube detector, such as a phosphor screen. Data can be accumulated at the rate of the order of $10^8$ pulses per second. Because of the low photoelectron currents no image intensification is needed in order to overcome photocathode or electron-optical saturation effects. There is the further advantage that the use of the mode-locked laser in synchronism with a streak camera avoids any non-linear effects in the experimental medium under investigation, since the power of the individual pulses can be kept low, for example by using pulses having an average power of only tens of milliwatts. As mentioned above, a steady streak image can readily be obtained, which means that if an optical multichannel analyser is used to record and store the superimposed streak images the system is equivalent to a picosecond oscilloscope. This use of digital recording and storage techniques enables one to achieve a very convenient system for the study of low light level phenomena with picosecond time resolution.

The combination of a continuous train of picosecond pulses generated from a mode-locked laser with a continuously scanning streak camera synchronised with the pulse train provides a new approach to the measurement and study of picosecond phenomena at very high repetition rates.

BRIEF DESCRIPTION OF THE DRAWINGS

Various embodiments and features of the invention will now be described in more detail by way of example and with reference to the accompanying drawings, in which:

FIG. 4 is a schematic diagram illustrating an alternative way of synchronising the streak camera and the laser;

FIG. 5 shows a plate having a linear deflection slit for the image tube of the streak camera;

FIG. 6 shows the voltages applied to the deflection electrodes of the image tube of the streak camera;

FIG. 7 shows a plate having an array of slits;

FIG. 8 shows a preamplifier used with the plate;

FIG. 9 is a schematic diagram of a modified streak camera system; and

FIG. 10 is a schematic diagram of a streak camera system for the measurement of dye fluorescence lifetimes.

DESCRIPTION OF THE PREFERRED EMBODIMENT

The method and apparatus of the present invention involve the use of an electron-optical streaking image tube which forms the basis of the streak camera. The image tube is preferably of the type described in my U.S. Pat. No. 3,761,614, my U.S. Pat. No. 3,973,117 or my U.S. Pat. No. 4,021,693.

Figure 1:
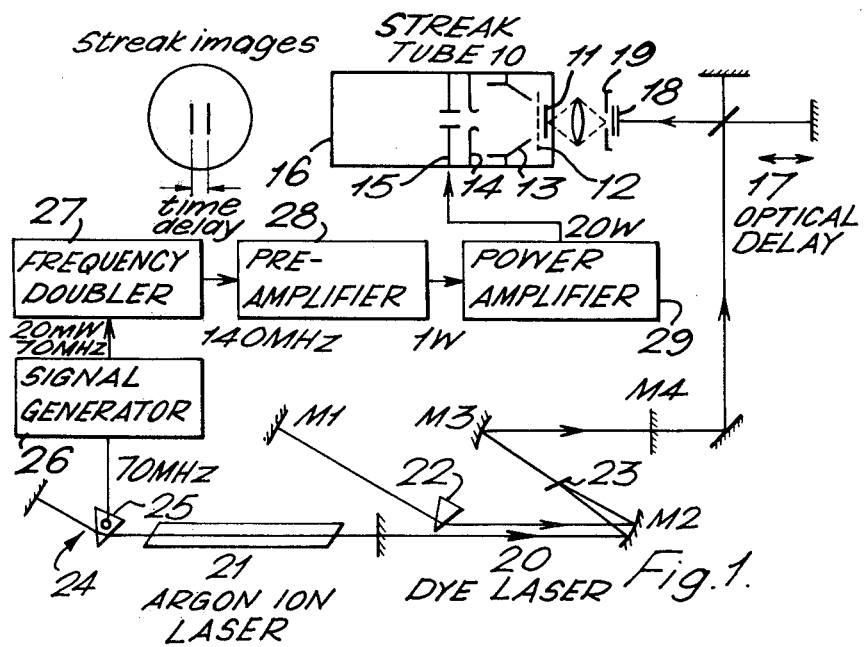
FIG. 1 is a schematic diagram of a streak camera synchronised with a c.w. mode-locked laser in accordance with the invention.

FIG. 1 shows one arrangement for synchronous operation of a continuous wave mode-locked dye laser and a picosecond streak camera. The image tube 10 of the streak camera comprises a photocathode 11, an extraction mesh 12, focussing electrodes 13, an anode 14, a single pair of deflection electrode plates 15, and a phosphor screen 16. At the input side of the image tube 10 a pulse train from a variable length optical delay line 17 is filtered in a filter 18 and is passed through a linear slit 19 and is focussed on the photocathode 11. The pulse train comes from a continuous wave mode-locked dye laser 20 which is synchronously pumped by an argon ion laser 21. The dye laser 20 comprises four mirrors M1, M2, M3 and M4, a quartz prism 22 for frequency narrowing and tuning, and a dye jet 23. Output coupling is through the mirror M4 which is a 6% transmitting plane mirror. The continuous wave dye laser 20 is mode-locked by virtue of the fact that the pumping argon ion laser 21 is actively mode-locked with an acousto-optic modulator indicated generally at 24. This comprises a mode-locked prism 25 fitted with a transducer. A signal generator 26 which incorporates a master RF oscillator provides a 70 MHz, 1 watt signal to the transducer of the acousto-optic mode-locking prism 25. The signal generator 26 also feeds a 70 MHz, 20 mW signal to the frequency doubler 27 which passes a 140 MHz, 20 mW signal to a pre-amplifier 28, which boosts the signal to 1 watt. A power amplifier 29 then provides a 140 MHz, 20 W output which is connected by way of a coaxial line to the streak-tube deflection plates 15. In this way the driving voltage for the deflection plates 15 is synchronised with the laser pulse train. The driving voltage is preferably sinusoidal and of the order of 3 kV. The driving voltage for the deflection plates 15 of the streak tube can provide a linear deflection of more than 5 cm on the phosphor screen 16. The synchronously pumped dye laser gives pulses of duration less then 3 picoseconds and the writing speed of the streak camera is adjusted accordingly. The optical delay line 17 is arranged to produce two sub-pulses of variable separation from each incident pulse for calibration purposes. A time resolution of the order of 5 picoseconds or less can be achieved with this arrangement.

Figure 2:
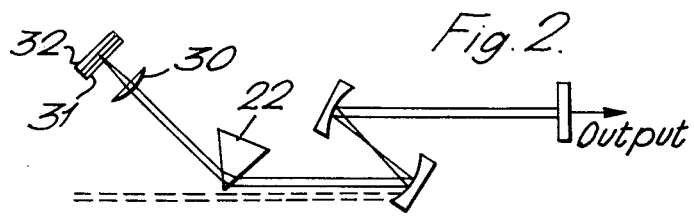
FIG. 2 is a schematic diagram of an alternative laser arrangement.

FIG. 2 shows an alternative laser arrangement. Here, there is shown a hybrid system with synchronous pumping and the use of a saturable absorber dye cell. The dye laser beam is focussed down by a plano-convex lens 30 into a thin variable-gap dye cell 31 containing a saturable absorber solution flowing in contact with a 100% reflectivity mirror 32. This hybrid laser arrangement generates peak power comparable with the laser system of FIG. 1 but at reduced efficiency.

Figure 3:
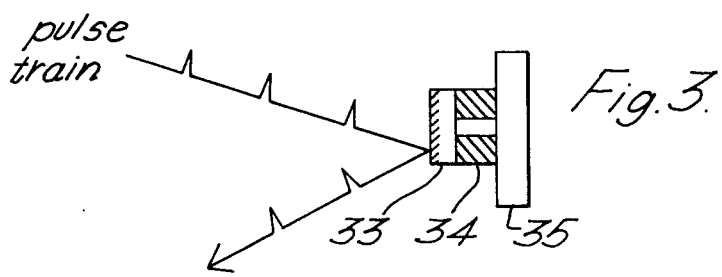
FIG. 3 shows a mechanical scanning system for adjustment of the laser mirrors.

The movement of the mirrors of the lasers can be achieved for example by the use of a piezo electric mount. Such an arrangement is shown in FIG. 3. FIG. 3 shows a pulse train incident on a reflecting mirror 33. The mirror is carried on a piezoelectric element 34 which is connected to a suitable voltage supply and is carried on a mechanical mount 35.

More generally, the mechanical scanning system shown in FIG. 3 can be used as an alternative to the use of a relatively slow deflection system inside the image tube 10. Thus, the optical delay of the laser pulses can be varied by using a scanning mirror driven by for example a piezoelectric mechanical movement.

In the system of FIG. 1, where the laser is actively mode-locked by the acousto-optic modulator 24, the master RF oscillator for the modulator is used also to drive the amplifier 28, 29 to generate the synchronous streak camera deflection voltage signal. In an alternative arrangement as shown in FIG. 4, synchronisation between the laser pulse train and the deflection electrode voltage signal can be achieved by detecting the laser pulses with a photo-detector 36 and then feeding an electrical output signal therefrom to a sync circuit 37 to lock the driving voltage from a signal generator 38 to the pulse train.

It is a further advantage of the system of the present invention that by combining the use of a continuous wave mode-locked laser with a synchronously driven streak camera the experimental parameters of the system can easily be adjusted by using the streak camera itself as a monitor. The synchronised use of the laser and camera permits rapid adjustment of the laser itself to give minimum pulse duration, by keeping the laser cavity length in automatic adjustment. One can also adjust the laser for maximum energy output or for other desirable parameters. In the case of a system such as is shown in FIG. 1 but in which the laser system consists of only the argon ion laser, then the frequency of the signal generator 26 which drives the acousto-optic modulator prism 25 can be adjusted by using the streak camera picture to monitor the pulse characteristics. The length of the argon or other ion laser can be adjusted for optimum performance for a given signal generator frequency by moving the mirror at the output of the argon ion laser.

Similarly, if the argon or other ion laser is used to mode-lock the dye laser, the optical length of the dye laser can be adjusted for optimum performance by adjusting the position of one of the mirrors M1 and M4. These adjustments of the ion laser and of the dye laser can be carried out iteratively until optimum performance of the two lasers is achieved, since the continuously available display of the synchronously driven streak camera provides the necessary monitor of the pulse profiles and intensities.

In my U.S. Pat. No. 3,973,117 there is described an image tube which comprises a photocathode, an extraction electrode in the form of a mesh immediately adjacent to the emission side of the photocathode, a focussing electrode, an anode, opposed pairs of deflector electrodes, and an apertured disc beyond the deflector electrodes and which replaces the conventional phosphor screen. On the output side of the apertured disc there is provided an electron multiplier. The aperture in the disc in the aforesaid patent specification is a radially extending slot or slots and the pairs of deflector electrodes are controlled to produce a continuous circular or spiral deflection path on the disc. Although a circular or spiral scan is appropriate for certain applications, it is now considered that a linear scan has certain advantages in many circumstances.

In the image tube described in my aforesaid U.S. Pat. No. 3,973,117 the apertured plate or disc is provided within the image tube itself. According to a feature of the present invention this image tube plate with a radial slot is replaced by a plate or disc 40 having a slit 41 perpendicular to the axis of the tube as shown in FIG. 5. The optical image is thus likewise a slit-form image and an array of photodiodes can be mounted along the length of the slit, inside the tube, or on the end window, to give the desired spatial information about the streak image along the length of the slit.

FIG. 6 illustrates how the scanning can be carried out in the image tube 10 in practice. The electron-optical image is deflected repetitively across the plane containing the slit 41 at a rapid speed to give time resolution. The deflection voltage is a simple sinusoidal voltage as shown in FIG. 6a applied to the deflection plates 15 and synchronised with the laser pulse train. A slowly varying d.c. bias voltage as shown in FIG. 6b is also applied to the deflection electrodes 15 from a separate signal generator, so that the optical image is then scanned across the slit 41 sequentially in order to give the intensity profile in a direction perpendicular to the slit length. This occurs at the same time that the rapidly oscillating sine voltage provides the time resolution. By the use of a plurality of photodetectors positioned along the length of the slit 41, information such as changes in wavelength can be obtained as a function of time.

Still referring to FIG. 6, the deflection voltage shown in FIG. 6a at a frequency of hundreds of MHz is arranged so that the linear parts ab, cd cover the working area of the plane containing the slit 41. The reading scanning voltage shown in FIG. 6b is arranged to vary slowly compared with the time resolution scanning voltage, for example by arranging that it varies in ramp fashion up and down at a rate of kilohertz or slower.

Instead of using just a single slit 41, one can use an array of parallel slits 42, each perpendicular to the time-varying direction, as shown in FIG. 7. Preferably, the individual slits 42 are each separated by a distance equal to the slit width, for example of the order of 10 μm. By providing a corresponding array of photodetectors behind each slit one can achieve multiplex detection. A smaller slow voltage deflection (FIG. 6b) is needed in this case, as compared with the single slit arrangement of FIG. 5, in order to read out the information. The necessary spatial deflection is the width of the slit only.

Instead of using an array of slits and a corresponding array of photodetectors, a charge-coupled detector array can be used and the information read out using electronic techniques only. Such a system could be for example an electron-bombarded self-scanned array (ISSA) or an optical multichannel analyser (OMA) at the end of the image tube to record the superimposed streak images. The linear intensity profiles can then be displayed subsequently on an oscilloscope or printed out with a pen recorder.

FIG. 8 shows the use of a microchannel plate amplifier 44 positioned in front of the apertured plate 40 in the image tube with an array of photodetectors 46 behind the plate. In a self-scanning system using an ISSA or similar device the microchannel plate amplifier 44 can be mounted in front of the ISSA or similar device to act as a preamplifier.

FIG. 9 shows an arrangement, using a synchronously driven streak camera, which, by the use of a beam splitter 50 and an interferometer 52, enables each laser pulse to be doubled in order to give a time-scale. The image tube 10 is here shown as including an optical multichannel analyser (OMA) connected to an oscilloscope or pen recorder 54. Picosecond pulses from a dye laser are incident on the beam splitter 50 and by varying one arm of the interferometer 52 one can achieve accurate calibration of the linearity of the repetitive scanning deflection.

FIG. 10 shows yet another application of the synchronously driven streak tube, wherein the streak tube is used for the measurement of dye fluorescence lifetimes.

With the repetitively scanning streak camera, as compared with single-shot measurements, the measurement of dye emissions and fluorescence lifetimes becomes simple, and the effects of varying the laser pulse parameters are immediately visible on a monitoring oscilloscope. The output of a dye laser is passed through an optical delay system 56 and is focussed into a cell 58 containing the sample. The output is then dealt with as described above using the streak tube 10, an OMA and an oscilloscope 54. By this means one can obtain measurements of the fluorescence of dyes with what is essentially a picosecond oscilloscope due to the use of the optical multichannel analyser. Variation of decay times as a function of wavelength can be studied by passing the fluorescence from the sample through a scanning monochromator 60 before the streak tube, as shown in FIG. 10.

Although in the various embodiments described above reference has been made to the use of a linear scan with a streak camera used in a single linear direction only, the present invention does not exclude the use of a circular or spiral deflection path. With a circular or spiral scan, a multiple array of radial slits or the use of a self-scanning array of photoelectron detectors is advantageous.

I claim:

1. Apparatus for obtaining a record of repetitive optical phenomena having durations in the picosecond or sub-picosecond range, comprising an image tube for receiving repetitive pulse-form images and converting them to electron images; electron deflecting means to deflect the electrons in their passage through the tube; a continuous wave mode-locked laser arranged to generate a repetitive series of pulses; guide means for directing the laser pulse train to the image tube; means to supply to the deflecting means a time-resolving scanning voltage; means to scan the electron images in the tube in a linear direction; synchronising means to synchronise the deflection of the electron images in the tube with the repetition rate of the pulse train from the continuous wave mode-locked laser; and means to scan the electron image across the tube to read out the time-resolved image profile.

2. Apparatus as claimed in claim 1, in which the synchronising means comprises a signal generator arranged to provide a reference frequency signal both to the laser and to the electron deflecting means.

3. Apparatus as claimed in claim 2, in which said synchronising means comprises an r.f. oscillator, and which also includes an acousto-optic modulator with which the laser is actively mode-locked, said oscillator supplying the reference frequency signal to said modulator.

4. Apparatus as claimed in claim 1, in which the synchronising means comprises a photodetector arranged to receive the pulse train, signal generator means connected to said electron deflecting means, and frequency locking means synchronising the signal generator means with the photodetector output.

5. Apparatus as claimed in claim 1, in which the laser comprises a synchronously pumped mode-locked continuous wave dye laser.

6. Apparatus as claimed in claim 1, in which the guide means includes optical delay means.

7. Apparatus as claimed in claim 1, in which the laser comprises mirrors carried on piezoelectric elements arranged to be connected to a voltage source for mechanical scanning movement.

8. Apparatus as claimed in claim 1, in which the image tube includes an apertured disc on which the streak images impinge, the disc having one or more slits perpendicular to the axis of the image tube.

9. Apparatus as claimed in claim 8, in which the apertured disc is provided with a plurality of parallel slits of equal width and perpendicular to the time-varying direction with each slit spaced at a distance equal to the slit width.

10. Apparatus as claimed in claim 1, which includes an optical multichannel analyser at the output end of the image tube.

11. Apparatus as claimed in claim 1, in which the guide means includes a beam splitter and an interferometer.

12. Apparatus as claimed in claim 1, which includes a sample cell contining a fluorescent dye positioned in the pulse train path between the laser and the image tube.

13. Apparatus as claimed in claim 1, in which said time-resolving scanning voltage is a sinusoidal voltage.

14. Apparatus as claimed in claim 1, in which the electron deflecting means comprises a single pair of deflection electrodes.

15. Apparatus as claimed in claim 1, in which the read-out scan is effected symmetrically about the tube axis.

16. Apparatus as claimed in claim 1, in which said read-out scan means scans the image at a rate synchronised to the repetition rate of the laser pulse train.

17. Apparatus as claimed in claim 1, in which the read-out scan means generates a slowly varying bias voltage signal to scan the image across the tube.

18. Apparatus as claimed in claim 1, which includes means to obtain direct electronic read-out from the output end of the image tube.

19. A method of obtaining a record of repetitive optical phenomena having durations in the picosecond or sub-picosecond range which comprises generating from a continuous wave mode-locked laser a repetitive series of pulses; feeding the pulses to the input of a streaking image tube; applying a time-resolving scanning voltage to electron deflecting means to deflect the electrons in their passage through the tube; and operating the streaking image tube in a continuous scanning mode with the time-resolving scanning voltage synchronised with the repetition frequency of the laser pulse train and with the electron images scanned linearly in the image tube; and scanning the electron image across the tube to read out the time-resolved image profile.

20. A method as claimed in claim 19, which includes supplying to the electron deflecting means both a sinusoidal voltage synchronised with the pulse train and also a bias voltage to scan the image across the tube.

21. A method as claimed in claim 20, in which the sinusoidal voltage is at a frequency of the order of hundreds of megahertz and the bias voltage is at a frequency in the kilohertz range.

22. A method as claimed in claim 20, in which the read-out scan is effected linearly across the tube with a direct electronic read-out of the image profile.

* * * * *